United States Patent [19]
Rock

[11] 4,043,412
[45] Aug. 23, 1977

[54] COUNTING SCALE AND METHOD

[75] Inventor: Frank C. Rock, Santa Rosa, Calif.

[73] Assignee: National Controls, Inc., Santa Rosa, Calif.

[21] Appl. No.: 668,855

[22] Filed: Mar. 22, 1976

Related U.S. Application Data

[63] Continuation-in-part of Ser. No. 510,467, Sept. 30, 1974, Pat. No. 3,951,221.

[51] Int. Cl.² .............................................. G01G 19/04
[52] U.S. Cl. ..................................... 177/25; 177/200; 235/151.33
[58] Field of Search .................. 177/25, 200, DIG. 3; 235/151.33

[56] References Cited

U.S. PATENT DOCUMENTS

| | | | |
|---|---|---|---|
| 3,552,511 | 1/1971 | Marcheso et al. | 177/25 X |
| 3,665,169 | 5/1972 | Henderson et al. | 177/25 X |
| 3,716,706 | 2/1973 | Gray | 177/25 X |
| 3,789,202 | 1/1974 | Yamanaka | 177/25 X |
| 3,860,802 | 1/1975 | Knothe et al. | 177/25 X |
| 3,916,173 | 10/1975 | Williams, Jr. et al. | 177/200 UX |

Primary Examiner—George H. Miller, Jr.
Attorney, Agent, or Firm—Flehr, Hohbach, Test, Albritton & Herbert

[57] ABSTRACT

Counting scale and method utilizing a single load cell for determining the weights of both a sample and an unknown quantity of articles to be counted. The weights are combined to determine the number of articles, and this number is displayed. The platform of the scale is mounted on and supported by the load cell in a system requiring no levers, pivots or other moving parts. Weight readings are averaged on a moving average basis, and with no load on the scale, any drift is cancelled by increasing or decreasing the weight readings in small increments during successive counting cycles to maintain an accurate zero reference.

15 Claims, 8 Drawing Figures

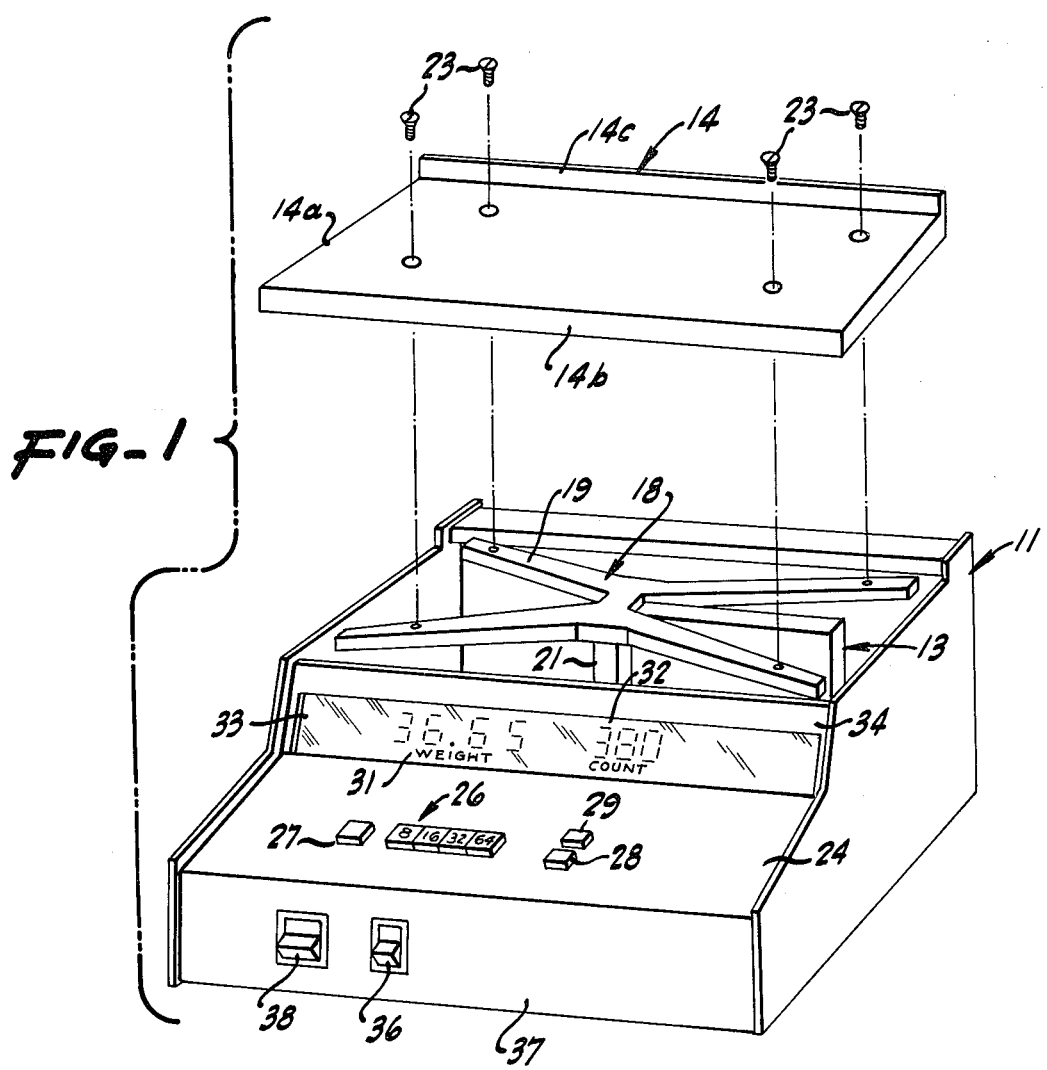
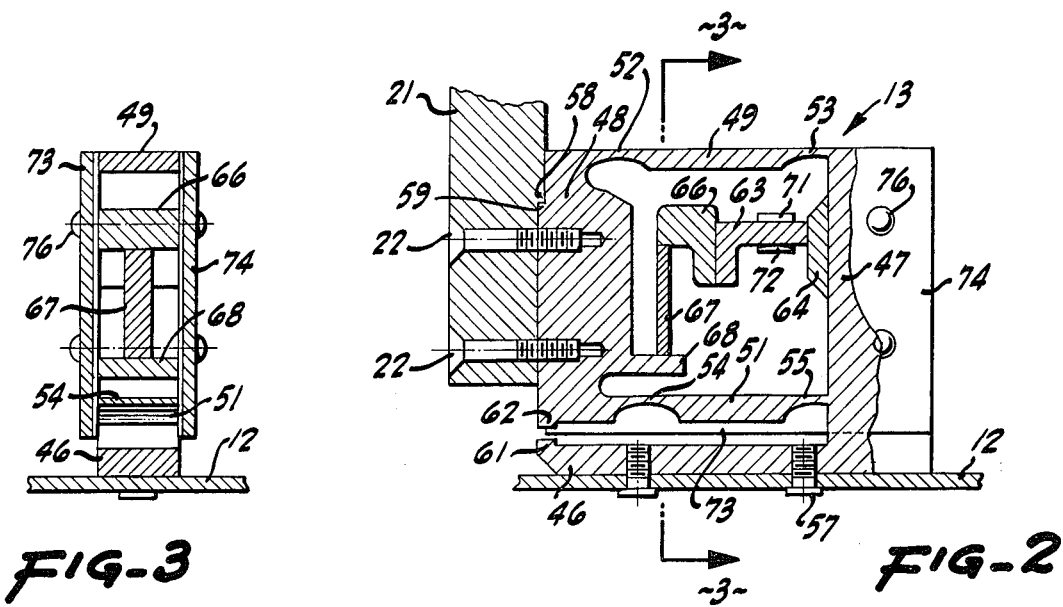
FIG-1
FIG-3
FIG-2

FIG-5

COUNTING SCALE AND METHOD

CROSS-REFERENCE TO RELATED APPLICATIONS

This application is a continuation-in-part of application Ser. No. 510,467, filed Sept. 30, 1974, now U.S. Pat. No. 3,951,221, and contains subject matter common to applications Ser. Nos. 642,482, 642,483 and 642,484, filed Dec. 19, 1975.

BACKGROUND OF THE INVENTION

This invention pertains generally to scales and more particularly to a counting scale for determining the number of articles in a group.

Heretofore, there have been some attempts to expedite the counting of large numbers of articles, such as electronic components and other small parts, by first weighing a known quantity or sample to determine the average weight of the articles, then weighing the unknown quantity and combining the weights to determine the number of articles. In order to provide sufficient resolution to accurately determine the weight of the sample and sufficient range to measure anything but a very small unknown quantity, it has generally been necessary to use two separate scales, one a low capacity scale for weighing the sample and the other a high capacity scale for weighing the unknown quantity.

The use of two scales has a number of obvious disadvantages. In addition to the inconvenience of having to work with two scales and make two separate readings, both scales must be calibrated to a high degree of accuracy. This can be difficult, particularly with electronic scales utilizing amplifiers which are seldom perfectly linear in practice. In addition, there are operational problems such as determining whether the sample should be added to the unknown quantity before the latter is weighed.

SUMMARY AND OBJECTS OF THE INVENTION

The invention provides a counting scale of wide range and high resolution utilizing a single load cell for determining the weights of both a sample and an unknown quantity of articles to be counted. The weights are combined to determine the number of articles, and this number is displayed. The platform of the scale is mounted on and supported by the load cell in a system requiring no levers, pivots or other moving parts. Weight readings are averaged on a moving average basis, and with no load on the scale, any drift is cancelled by increasing or decreasing the weight readings in small increments during successive counting cycles to maintain an accurate zero reference.

It is in general an object of the invention to provide a new and improved counting scale and method for determining the number of articles in a group.

Another object of the invention is to provide a counting scale and method of the above character utilizing a single load cell.

Another object of the invention is to provide a counting scale and method of the above character in which weight readings are averaged on a moving average basis to provide a more accurate reading than would be possible with individual weight readings.

Another object of the invention is to provide a counting scale and method of the above character in which the zero reference level is accurately maintained.

Additional objects and features of the invention will be apparent from the following description in which the preferred embodiments are set forth in detail in conjunction with the accompanying drawings.

BRIEF DESCRIPTION OF THE DRAWINGS

FIG. 1 is a perspective view, partially exploded, of one embodiment of a counting scale according to the invention.

FIG. 2 is a fragmentary sectional view, partly broken away, of a portion of the scale of FIG. 1, illustrating the load cell and the manner in which the platform is mounted thereon.

FIG. 3 is a cross-sectional view taken along line 3—3 in FIG. 2.

FIG. 5 illustrates the organization of a weight register in the computing system of FIG. 4.

DESCRIPTION OF THE PREFERRED EMBODIMENTS

Figure 4:
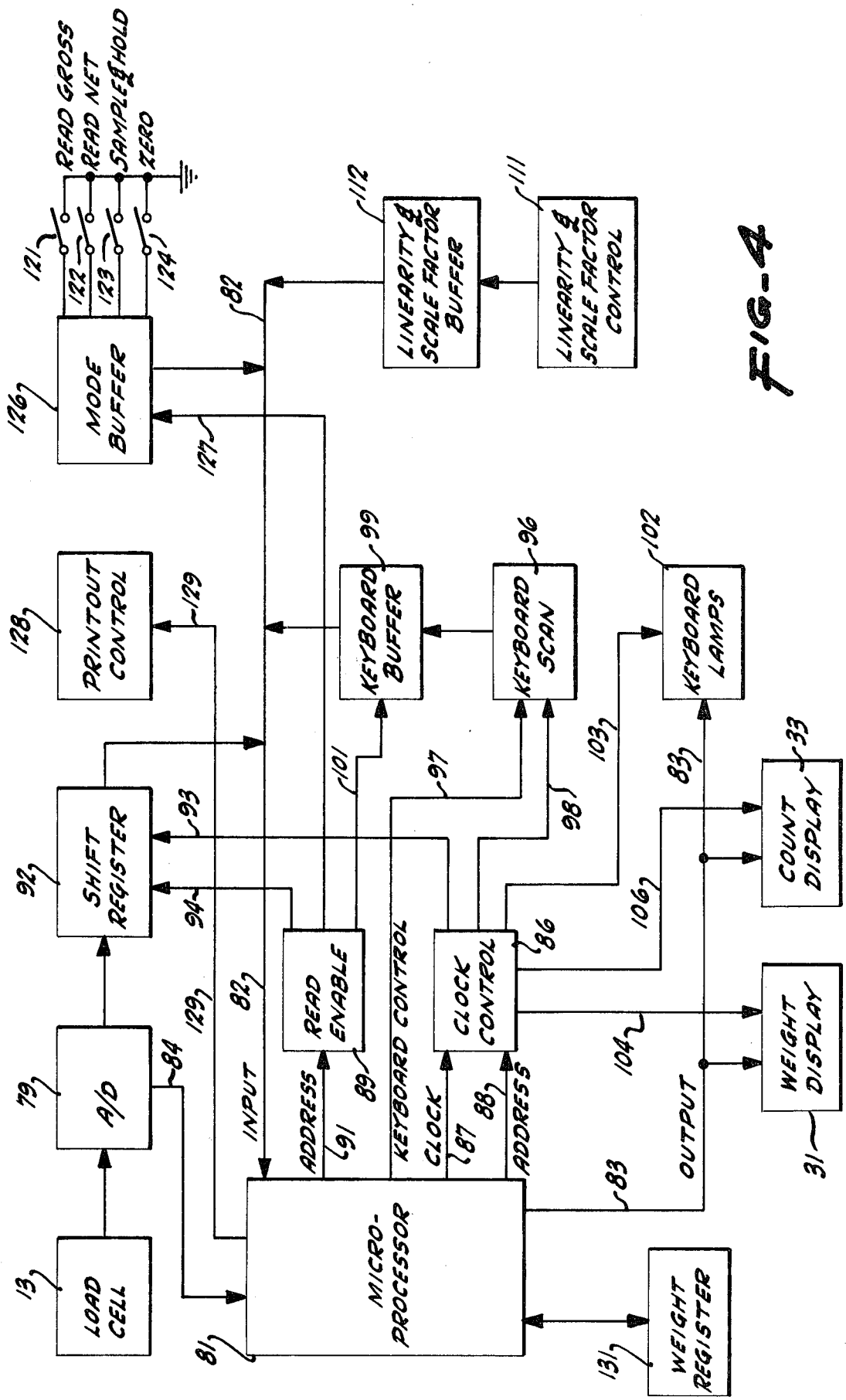
FIG. 4 is a block diagram of the computing system of the counting scale of FIG. 1.

As illustrated in FIGS. 1-3, the counting scale includes a console or cabinet 11 having a bottom wall or base 12 on which a load cell 13 is mounted. A platform 14 for receiving objects to be weighed is mounted on and supported by the load cell. As illustrated, the platform comprises a horizontal deck 14a, a depending skirt 14b which extends along the front and side edges of the deck, and an upstanding flange 14c which extends along the rear edge of the platform. The platform rests upon a load spider 18 having a plurality of diagonally extending arms 19 and a depending stem 21 which is secured to the load cell by screws 22. The platform is affixed to the spider arms by screws 23.

A keyboard 24 is provided toward the front of cabinet 11, and the controls for operation of the scale are mounted on the keyboard. A row of keys 26 provides means for selecting the number of articles to be used as a sample. In the embodiment illustrated, samples consisting of 8, 16, 32 or 64 articles can be selected. Other controls on the keyboard include a ZERO or TARE key 27, a RESET key 28, and a PRINT key 29. In one presently preferred embodiment, the keys are fabricated of a transluscent material, and lamps mounted beneath the keys are illuminated to indicate the functions which have been selected.

A WEIGHT display 31 and a COUNT display 32 are provided for indicating the weight of a load on the scale, and the number of articles therein. In the preferred embodiment, each display includes a plurality of 7-segment display elements mounted behind a translucent window 33 in a sloping panel 34 above keyboard 24. A STOP MOTION/ CONTINUOUS DISPLAY switch 36 is mounted on the front apron of the cabinet. When this switch is in one position, the weight and count are not displayed until a steady state is reached after a change in the load. In the other switch position, the running values of the weight and count are displayed. A POWER ON-OFF switch 38 is mounted on the apron next to switch 36.

As illustrated in FIGS. 2–3, load cell 13 includes a generally rectangular framework comprising a base 46, a side frame 47, a load arm 48, an upper arm 49, and a lower arm 51. Arms 49 and 51 are substantially equal in length, and they are generally parallel to each other and to base 46. The frame is a unitary structure, and it is formed to include flexures 52–55 between arms 49, 51, side frame 47 and load arm 48.

Base 46 is affixed to the bottom wall or base 12 of cabinet 11 by screws 57, and the stem 21 of load spider 18 is mounted on load arm 48 of the load cell. Load arm 48 is provided with an upwardly facing shoulder 58 which is engaged by a downwardly facing shoulder 59 on the load spider stem. A load applied to platform 14 is thus transmitted to load arm 48 and produces a downward deflection of this arm corresponding to the weight of the load. Stops 61, 62 formed on base 46 and load arm 48 limit the travel of the arm to provide overload protection.

A beam 63 is rigidly affixed at one end to a block 64 which is secured to side frame 47. The other end of the beam is affixed to a block 66, and tie rod 67 extends between this block and a protrusion 68 formed on load arm 48. As best seen in FIG. 3, the tie rod is narrower than arms 49, 51 and flexures 51–55, and it extends in a direction generally parallel to the direction in which load arm 48 is deflected by a load on the platform.

When load arm 48 is deflected by a load, the force exerted by the load is transmitted to beam 63 by tie rod 67, causing the beam to bend by an amount corresponding to the weight of the load. The amount of bending is detected by strain gauges 71, 72 which are mounted on beam 63 and have electrical resistances which depend upon the forces applied to the beam. An electrical current is applied to the strain gauges by conventional wiring, not shown, to provide an output voltage corresponding to the weight of the load.

Cover plates 73, 74 extend over the sides of the load cell to enclose the same. These plates are secured to side frame 47 by suitable means such as rivets 76. Even though the platform area is substantially larger than the load cell, the reading of the load cell is generally not affected by the placement of the load on the platform or side-loading effects.

Referring now to FIG. 4, the output of load cell 12 is connected to the input of an analog-to-digital converter 79 which converts the output voltage from the load cell to digital signals corresponding to the weight of the load at a suitable clock rate such as 15 times per second. In the preferred embodiment, the A/D converter is similar to a conventional dual slope digital voltmeter modified to provide output signals in straight binary form, rather than binary coded decimal form. The binary form is particularly suitable for use in a scale in which a computer is used to process the data because of the relative ease of binary arithmetic compared to decimal arithmetic.

Means is provided for processing the signals from A/D converter 79 to determine the weight of a load on platform 14 and the number of articles in a group on the platform. This means includes a microprocessor, designated generally by reference numeral 81, having a data input line 82 and a data output line 83. One suitable microprocessor is a four-bit parallel system available from Intel Corporation, Santa Clara, Calif., under the trademark MCS-4, and includes a model 4004 central processor unit (CPU), model 1702 programmable read-only memories (PROM's), model 4002 random access memories (RAM's).

The microprocessor receives a signal on line 84 from converter 79 each time a conversion is made, and it delivers clock pulses and clock address signals to a clock control 86 on lines 87 and 88. Read address signals are applied to a read enable controller 89 on an address line 91.

The binary output signals from A/D converter 79 are read into a shift register 92 upon receipt of a clock pulse on line 93. The signals in the shift register are read into the microprocessor through input line 82 upon receipt of a READ signal on line 94.

Sample size selection keys 26 are scanned by a keyboard scanner 96 which receives control signals on line 97 from the microprocessor and clock signals on line 98 from the clock control. Upon receipt of a clock signal, the scanner transfers the data from the keyboard to a buffer register 99 from which it is read into the microprocessor through input line 82 upon receipt of a READ signal on line 101. The keyboard lamps, designated generally by reference numeral 102, are illuminated in accordance with output data on line 83 upon receipt of clock pulses on line 103.

Weight display 31 and count display 32 receive data from output line 83 and display this data in response to clock pulses on lines 104 and 106, respectively.

A linearity and scale factor control 111 is connected to the microprocessor through a buffer 112 and input line 82 to provide compensation for any non-linearities in the load cell and associated circuitry and to set a desired relationship between the weight readings and the load cell output. This control is generally set during the initial calibration of the scale and thereafter changed only in the event that recalibration is necessary.

Switches 121–124 are provided for selecting the mode of operation of the scale. Closure of switch 121 conditions the scale to read gross weight, and closure of switch 122 conditions the scale to read net weight. These switches are generally used only for test purposes, and they can be located inside cabinet 11. Switch 123 represents the contacts of switch 36 in FIG. 1, and when closed this switch inhibits the display of weight and count data until the scale stops moving following a change in the load. Switch 124 is operated by ZERO key 27, and closure of this switch serves to reset the weight reading to zero. Data indicating the conditions of the switches is present in a buffer register 126, and this data is read into the microprocessor through input line 82 upon receipt of a READ signal on line 127.

The microprocessor is connected to a printout control 128 by a line 129, and the microprocessor can control the operation of a printer, recorder or other device to which the printout control is connected. Depressing PRINT key 29 causes the current weight and/or count reading to be transferred to the external device.

Figure 5:
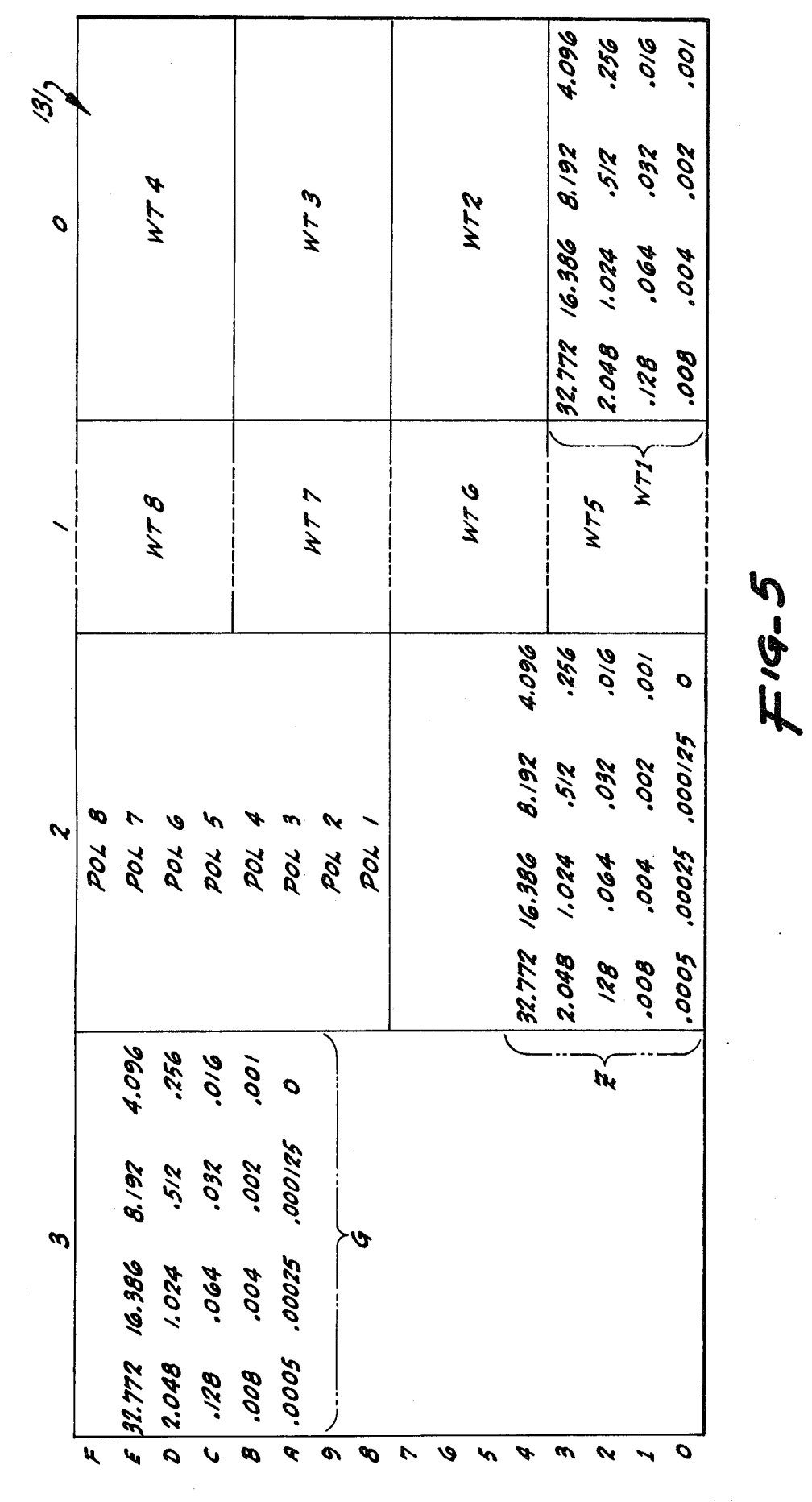

As illustrated in FIG. 5, weight data is registered in a weight register 131 which, in the preferred embodiment, comprises a random access memory. In order to enhance the accuracy of the scale, weight determinations are based on averaged readings, rather than individual readings. For this purpose, the eight most recent readings from converter 79 are read into memory cells in register 131 on a rotating basis, whereby each new reading replaces the oldest reading in the register. The register is divided into four sections, designated 0–3, and the memory cells for the incoming weight readings, designated WT1-WT8, are located in sections 0 and 1. Each of the cells contains 16 bits arranged in four 4-bit bytes, and up to 64,000 counts can be registered in each cell. In order to provide a resolution of 1 count in 100,000, both positive and negative counts are used, and a suitable count such as −50,000 is chosen as the zero reference. As illustrated for WT1, the least significant 4 bits in each cell range in significance from 1 count (0.001% of full scale) to 8 counts (0.008% of full scale), the next most significant four bits range from 16 counts (0.016% of full scale) to 128 counts (0.128% of full scale), the next most significant 4 bits range from 256 counts (0.256% of full scale) to 2,048 counts (2.048% of full scale), and the most significant four bits range from 4,096 counts (4.096% of full scale) to 32,772 counts (32.772% of full scale).

The polarities of weight readings WT1-WT8 are entered into a polarity register in section 2 of register 131. In this register, positive polarities are indicated by the number 0000, and negative polarities are designated by the number 0001.

The weight readings in register 131 are averaged each time a new reading is taken to provide a moving average of the weight readings. This average is registered in a totalizing register in section 3 of register 131. The polarity of the average is registered in a computer status register in a form similar to the manner in which the polarities of the weight ratings are registered in the polarity register.

In the preferred embodiment, the averaging is done by adding the least significant 4 bits of the first two weight readings together and registering the sum in byte A of the totalizing register. The process is continued for four bit groups of increasing significance until the number stored in the totalizing register is the sum of the first two weight cells. The polarities of the two readings are then checked, and if they are the same, this polarity is assigned to the sum registered. If the polarities are different the polarity of the sum is determined by the presence or absence of a carry from the addition. If there is a carry, the sum is positive, and if there is no carry, the sum is negative. The correct polarity is assigned to the sum. This process is continued until all eight weight readings have been added together and the number in the totalizing register represents the total of the eight readings and the polarity registered in the status register is the polarity of the total.

Since the sum of eight binary numbers is equal to one-half of the average of the numbers, the number registered in the totalizing register upon completion of the addition process is equal to one-half of the average of the weight readings. To get the average, the total must be multiplied by two, and this is done simply by shifting the number in the totalizing register one place to the left, following which it will be in the form illustrated in FIG. 5. It will be noted that the resolution has increased from 0.001% of full scale for the individual readings to 0.000125% for the average.

The number registered in the totalizing register represents the average gross weight of the load during eight successive clock intervals. The average net weight can be determined by subtracting the average gross weight at a reference time, e.g., before the load is placed on the scale, from the current value of the average gross weight. In the preferred embodiment, this subtraction is effected by storing a number Z which is the complement of the average gross weight G at the reference time. This number is stored in section 2 of register 131, and its polarity is stored in another status register. The average net weight is then determined by adding the numbers G and Z together, and the polarity of the net weight is stored in the shift register. As a result of the averaging and doubling process, the least significant bit of the number Z represents 0.0000625% of full scale.

Figure 6:
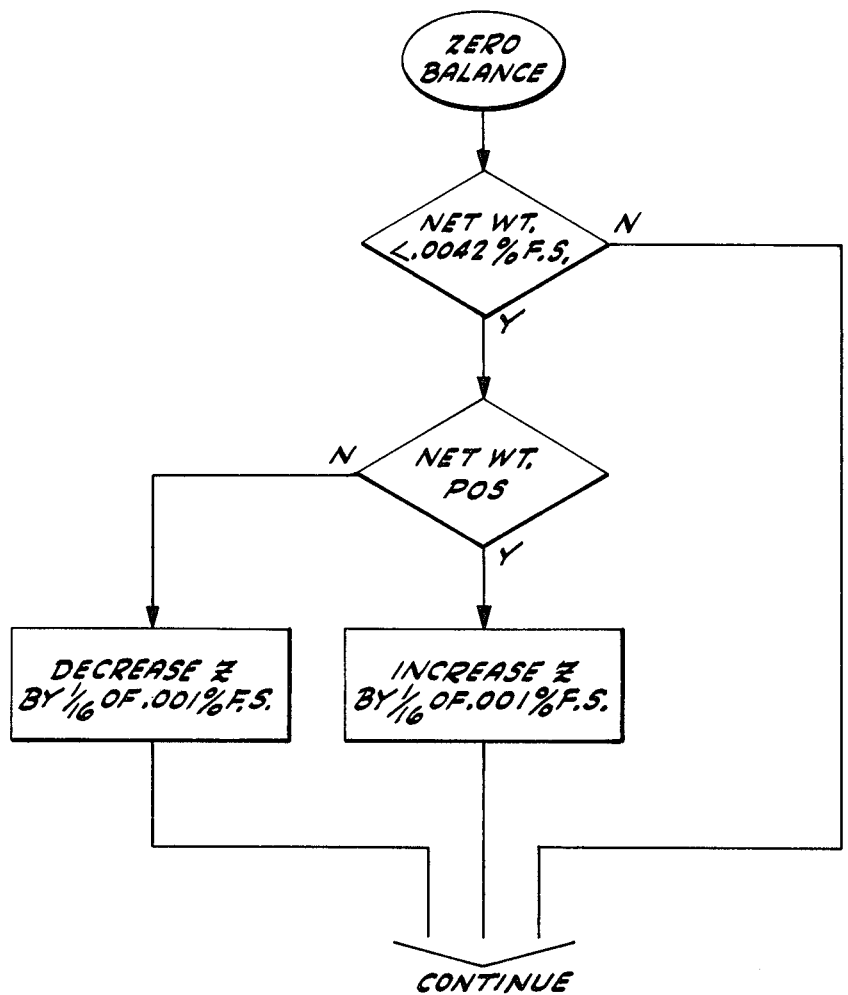
FIG. 6 is a flow chart of a program for maintaining an accurate zero reference in the system of FIG. 4.

As illustrated in FIG. 6, means is provided for increasing or decreasing the net weight reading in small increments during successive counting cycles to maintain an accurate zero reference. The net weight is checked during each counting cycle, and if the absolute value is greater than zero but less than 0.004% of full scale, the net weight is made 1/16 of 0.001% closer to zero by incrementing or decrementing the number Z by that amount. If the net weight is positive, the number Z is increased by 1/16 of 0.001% of full scale, and if the net weight is negative, the number Z is decreased by this amount. The adjusting process continues in successive cycles until the net weight is exactly zero. If the absolute value of the net weight is greater than 0.004% of full scale, it is assumed that there is a load on the scale, and no adjustment is made. If desired, a value other than 0.004% can be utilized, but the value chosen should be less than the expected weight of articles to be weighed on the scale. Likewise, a different value can be used for the increment by which the net weight is adjusted. However, this value is preferably substantially less than the range in which adjustments are made.

Figure 7:
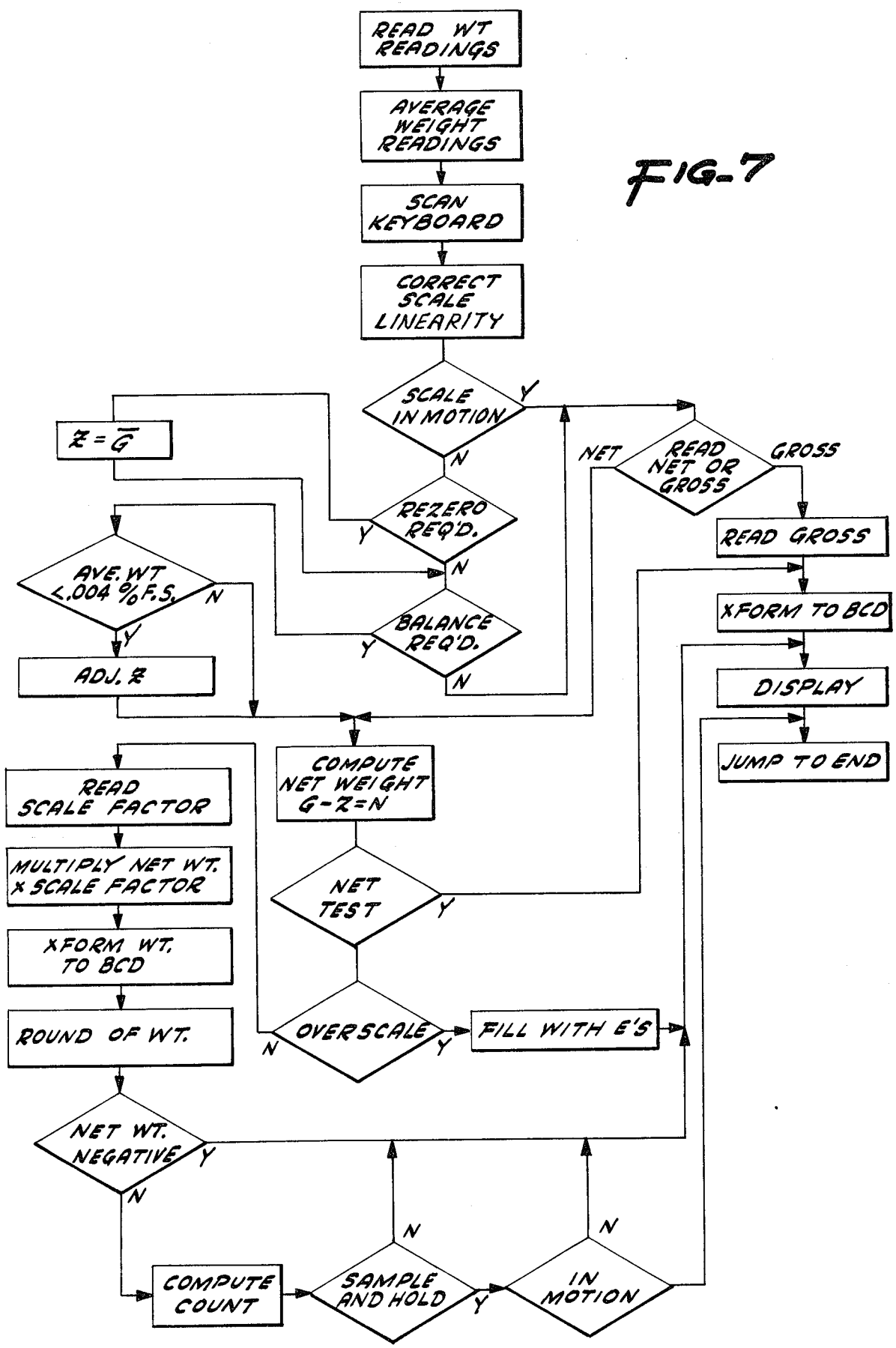
FIG. 7 is a flow chart of a program for determining weights and the number of articles in an unknown quantity on the scale of FIG. 1.

The flow chart of FIG. 7 illustrates the manner in which weight readings are made and the number of articles on the scale is determined. Instantaneous weight readings from converter 79 are read into the microprocessor where they are averaged in the manner described above. The keyboard is then scanned, and the weight readings are checked to determine whether the scale is in motion. If the scale is not in motion, and ZERO switch 124 is closed, the number Z is replaced by the complement of the number then in the totalizing register. The net weight is then checked for the zero reference level, and if necessary it is increased or decreased in the manner described above. If the scale is in motion, the zeroing and net weight adjustment steps are bypassed. If gross weight switch 121 is closed, the gross weight reading is transformed from binary to binary coded decimal form and displayed. If the net weight switch is closed, the net weight is transformed to binary coded decimal form and displayed. If the net weight switch is not closed, the magnitude of the weight is checked, and if the weight exceeds the capacity of the scale, an overscale indication such as plurality of E's is displayed by the weight display.

If the net weight switch is open and the weight reading is within the capacity of the scale, the scale factor set by control 111 is read, and the net weight is multiplied by this factor. Thereafter, the net weight is transformed to binary coded decimal form and rounded off to the desired number of digits. If the net weight is negative, it is displayed at this point and the COUNT subroutine which determines the number of articles on the scale is bypassed. If the net weight is positive, the number of articles is determined in the manner described below. If switch 123 is open, changes in the weight and count readings are displayed dynamically, and if the switch is closed, the count is not displayed until the scale stops moving and a steady stage is reached.

Figure 8:
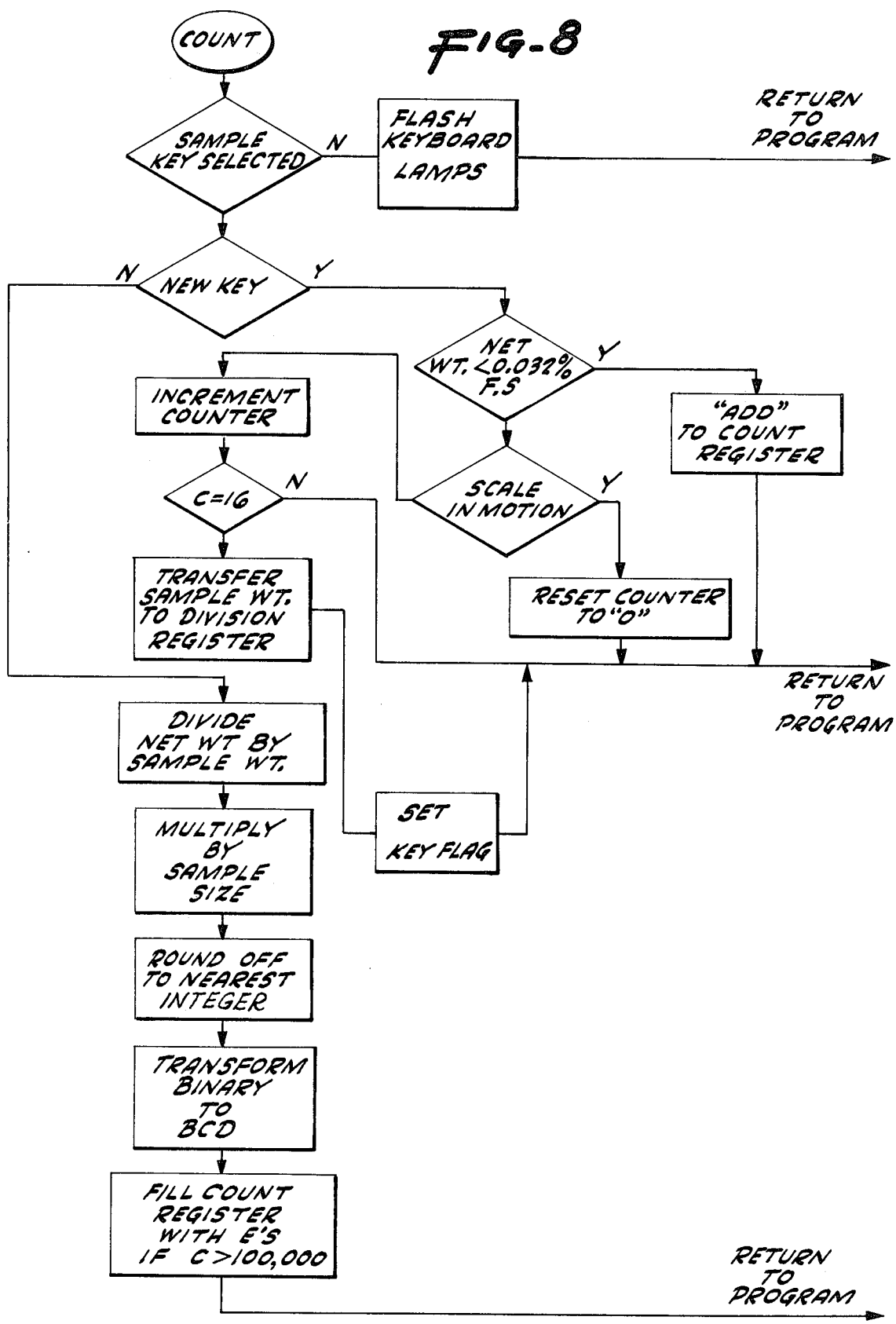
FIG. 8 is a flow chart of a program for determining the weight of a sample size and computing the number of articles in an unknown quantity on the scale of FIG. 1.

The manner in which the number of articles is determined is illustrated in FIG. 8. If none of the sample size selection keys 26 has been depressed, the remainder of the COUNT subroutine is bypassed, and only the weight is displayed. When a new SAMPLE SIZE key is depressed, the weight of the sample on the scale is checked to make certain that it is large enough to be determined accurately. In the embodiment illustrated, the net weight of the sample must be at least 0.032 percent of the full scale value, or the sample will be rejected and the count display will display the word "ADD", indicating that a larger sample is required.

If the sample is of sufficient size and the scale is not in motion, as indicated by the latest gross weight reading being within ±0.004 percent of the average gross weight, a counter is incremented. When 16 successive weight readings are within the specified range, this weight is stored as the sample weight, and a KEY flag is set to indicate that the sample has been established. If any of the weight readings differ by more than 0.004 percent of the average during the determination of the sample weight, the counter is reset to zero, and the process continues until 16 successive readings are within the specified range.

After the sample weight has been determined, the net weight on the scale is divided by the sample weight, and the quotient is multiplied by the number of articles in the sample, as defined by the key depressed to select the sample size. The resulting number corresponds to the number of articles on the scale. This number is rounded off to the nearest integer and transformed from binary form to binary coded decimal form. This number is then displayed unless it is greater than 100,000, in which case an over-scale indication is given, for example, by displaying a plurality of E's in the count display.

Operation and use of the counting scale can be described briefly. A sample consisting of 8, 16, 32 or 64 articles of a type to be counted is placed on platform 14, and the corresponding SAMPLE SIZE button 26 is depressed. The weight of the sample is indicated by display 31, and the number of articles in the sample is indicated by display 32. If the sample is too light to provide a satisfactory count, display 32 will display the word "ADD" to indicate that a larger sample should be used. Once a sample has been established, articles can be placed on or removed from platform 14, and display 32 will indicate the number of articles on the platform at any given time. A new sample can be entered either by depressing a new SAMPLE SIZE key or by depressing RESET key 28 and then depressing a new SAMPLE SIZE key.

Depressing ZERO or TARE key 27 resets the weight and count displays to zero and causes the weight then on the scale to be substracted from subsequent weight readings so that subsequent weight and count indications will represent net values. The ZERO key does not affect the weight stored for the sample, however.

Switch 36 permits the operator to determine whether the weight and count are displayed on a continuous basis or only when a steady state has been reached following a change in the load on the scale. Depressing PRINT key 29 causes the current weight and count information to be transferred to an external device connected to the scale.

In many counting applications, it is not necessary to know the weight of the articles being counted, and the weight display can be omitted if desired. Omission of this display will reduce the number of components required and permit the use of a less expensive load cell since absolute weight readings are no longer necessary.

Even without a separate weight display, weight readings can still be obtained by using a sample having a weight which corresponds to one of the sample sizes, e.g. 8, 16, 32 or 64 pounds. For example, by placing a weight of 0.32 pounds on the scale and depressing the key for a sampel size of 32, the scale will be calibrated to read in units of 0.01 pound. Likewise, by placing 64 grams on the scale and depressing the key for a sample size of 64 pieces, the COUNT display will give weight readings in grams.

It is apparent from the foregoing that a new and improved counting scale and method have been provided. While only certain presently preferred embodiments have been described, as will be apparent to those familiar with the art, certain changes and modifications can be made without departing from the scope of the invention as defined by the following claims.

I claim:

1. In a counting scale for determining the number of articles in a group: a base, a load cell mounted on the base for providing an electrical signal corresponding to the force applied thereto, single load receiving means mounted on the load cell and supported thereby for receiving articles to be counted, means responsive to the load cell signal for providing a digital signal which varies in accordance with the weight of articles placed on the single load receiving means, means responsive to the digital signal when a predetermined number of the articles is placed on the single load receiving means for storing a signal corresponding to the weight of the predetermined number of articles, and means for combining the stored signal with the digital signal produced when the group of articles is placed on the single load receiving means to provide an output signal corresponding to the number of articles in the group.

2. The counting scale of claim 1 wherein the load receiving means comprises a horizontally extending platform.

3. The counting scale of claim 1 further including manually operable means for providing a signal representative of the predetermined number of articles, the last named signal being combined with the stored signal and the digital signal in determining the number of articles in the group.

4. The counting scale of claim 1 wherein the means for providing a digital signal includes means for storing a second signal corresponding to the weight on the load receiving means at a predetermined time and means for combining the second stored signal with the load cell signal to effect subtraction of the weight represented by the second stored signal from the weight represented by the load cell signal and thereby provide a digital signal representative of the net weight on the load receiving means.

5. The counting scale of claim 1 further including zeroing means for maintaining the digital signal at a predetermined reference level in the absence of a load on the load receiving means, said zeroing means including means for iteratively checking the digital signal and changing said signal by a predetermined increment each time that the digital signal is found to differ from the reference level by less than a predetermined amount, the predetermined amount corresponding to a weight less than the weight of the predetermined number of articles and the predetermined increment being substantially less than the predetermined amount, whereby the digital signal is returned to the reference level in a plurality of discrete steps in the event of drift from said level.

6. The counting scale of claim 1 wherein the means for providing a digital signal includes means responsive to the load cell signal for providing successive signals representative of the instantaneous weight on the load receiving means, means for storing a predetermined number of the successive signals on a rotating basis whereby the oldest of the stored signals is replaced with the most recent of the successive signals, and means for determining the average of the stored signals to provide a signal representative of the average instantaneous weight of the load.

7. The counting scale of claim 1 further including means responsive to the digital signal for displaying the weight of the articles.

8. The counting scale of claim 1 further including means responsive to the output signal for displaying the number of articles in the group.

9. The counting scale of claim 8 further including means for inhibiting the display of the number until the member reaches a predetermined steady state.

10. In a counting scale for determining the number of articles in a group of the same: a load receiving member, means including a load cell connected to the load receiving member for providing an electrical signal corresponding to the weight of a load on said member, means responsive to the electrical signal for providing successive signals representative of the instantaneous weight of the load, means for storing a predetermined number of the successive signals on a rotating basis whereby the oldest of the stored signals is replaced with the most recent of the successive signals, means for averaging the stored signals to provide a digital signal representative of the average instantaneous weight of the load, means for iteratively checking the digital signal and changing said signal by a predetermined increment each time that the signal differs from a reference level by an amount less than a predetermined amount corresponding to a weight less than the expected weight of the load, the predetermined increment being substantially less than the predetermined amount whereby the digital signal is returned to the reference level in a plurality of discrete steps, means responsive to the digital signal produced when a sample comprising a predetermined number of the articles is placed on the load receiving member for storing a signal corresponding to the weight of the predetermined number of articles, means for combining the stored sample signal with the digital signal produced when the group of articles is placed on the load receiving member to provide an output signal corresponding to the number of articles in the group, and display means responsive to the output signal for indicating the number of articles in the group.

11. The counting scale of claim 10 further including means responsive to the digital signal at a predetermined time for storing a tare weight signal and means for effecting subtraction of the tare weight signal from the digital signal whereby the digital signal represents the net weight of the load.

12. The counting scale of claim 10 further including additional display means responsive to the digital signal for indicating the weight of the articles.

13. In a method for determining the number of articles in a group placed on a scale, the steps of: providing an electrical signal corresponding to the weight of a load on the scale, processing the electrical signal to provide successive signals representative of the instantaneous weight of the load at a predetermined clock rate, storing a predetermined number of the successive signals on a rotating basis whereby the oldest of the stored signals is replaced by the new signal provided during each clock cycle, determining the average of the stored signals to provide a digital signal representative of the average instantaneous weight of the load maintaining the digital signal at a reference level in the absence of a load by iteratively checking the signal and changing the signal by a predetermined increment each time that the signal differs from the reference level by an amount less than a predetermined amount, the predetermined amount corresponding to a weight less than the expected weight of the load and the predetermined increment being substantially less than the predetermined amount, storing a sample signal corresponding to the digital signal wherein a predetermined number of articles are placed on the scale, combining the stored sample signal with the digital signal produced when the group of articles is placed on the scale to provide an output signal corresponding to the number of articles in the group, and displaying a count corresponding to the output signal to indicate the number of articles in the group.

14. The method of claim 13 further including the steps of storing a tare weight signal corresponding to the digital signal at a predetermined time and effecting substraction of the tare weight signal from the digital signal whereby the digital signal represents the net weight of the load.

15. In an electronic counting scale: a base, a load cell mounted on the base for providing eiectrical signals corresponding to the forces applied thereto, a platform mounted on and supported by the load cell for successively receiving a sample consisting of a predetermined number of articles and a load consisting of an unknown number of the articles, and signal processing means including a microprocessor responsive to the load cell signals produced by the sample and the load for delivering an output signal corresponding to the number of articles in the load.

* * * * *